United States Patent [19]

Leiber et al.

[11] 4,318,272
[45] Mar. 9, 1982

[54] BRAKE FORCE AMPLIFIER

[75] Inventors: Heinz Leiber, Leimen; Robert Mergenthaler, Heidelberg, both of Fed. Rep. of Germany

[73] Assignee: Robert Bosch GmbH, Stuttgart, Fed. Rep. of Germany

[21] Appl. No.: 172,345

[22] Filed: Jul. 25, 1980

Related U.S. Application Data

[63] Continuation of Ser. No. 902,601, May 2, 1978, abandoned.

[30] Foreign Application Priority Data

May 26, 1977 [DE] Fed. Rep. of Germany ....... 2723734

[51] Int. Cl.³ .......................................... B60T 13/20
[52] U.S. Cl. ....................................... 60/553; 60/554
[58] Field of Search ............. 60/552, 553, 554, 547 R, 60/548, 582

[56] References Cited

U.S. PATENT DOCUMENTS

| | | | |
|---|---|---|---|
| 3,222,868 | 12/1965 | Stelzer | 60/553 |
| 3,589,481 | 6/1971 | Motsch | 60/553 |
| 4,034,566 | 7/1977 | Suketomo | 60/553 |
| 4,143,514 | 3/1979 | Leiber | 60/554 |

FOREIGN PATENT DOCUMENTS 2519836  11/1976  Fed. Rep. of Germany ........ 60/553

*Primary Examiner*—Abraham Hershkovitz
*Attorney, Agent, or Firm*—Edwin E. Greigg

[57] ABSTRACT

A brake force amplifier for the brake system of a motor vehicle, whose control valve is activated by means of a travel-limiting flexible element.

The travel-limiting flexible element is arranged outside of the amplifier, decentralized from the control valve. This arrangement saves space, and is easily disconnected should the auxiliary force fail. This is accomplished by engaging an hydraulic circuit, which is intended to transfer the motion of the travel limiting flexible element, with the assistance of a disengagement device. The disengagement device has a piston, which is subject to spring pressure on one side and to reservoir pressure on the other side and which eliminates the effect of the travel-limiting flexible element with the aid of a piston rod.

8 Claims, 4 Drawing Figures

BRAKE FORCE AMPLIFIER

This is a continuation of application Ser. No. 902,601, filed May 2, 1978, now abandoned.

BACKGROUND OF THE INVENTION

The invention relates to a brake force amplifier for the brake system of a motor vehicle, which is activated by a brake pedal by means of a travel-limiting flexible element and is provided with a control valve, which monitors both a connection from a pressure source to an augmenter cylinder that contains an augmenter piston, and a connection from the augmenter to a relief line. This type of brake force amplifier is known. These devices generally employ a control valve, which can be activated by the brake pedal by means of a so-called "travel-limiting flexible element" which includes an inlet and an outlet valve for the brake pressure medium.

In the released condition of these control valves, the inlet valve is generally closed, and the brake lines are relieved by means of the outlet valve, and in the braking condition the outlet valve is closed and the inlet valve opened. In order to make it possible to give the driver both a feel for the actuation of the brakes and an impression of the valve position attained, thereby informing him of the braking effectiveness, the travel-limiting flexible element is arranged between the brake pedal and the control valve. Thus a varying reaction force acts against the pedal pressure in dependence on the respective characteristic curve of the flexible element.

When the brakes are activated by the pedal the following activities occur between a pedal push rod piston and the control valve: The pedal push rod piston is pushed against the opposing force of the travel-limiting flexible element. In so doing, a sealing surface of a closing body comes into contact with an outlet seat, thus sealing the outlet valve. The travel path of the outlet valve closing body is designated as the outlet stroke.

The activating path of the pedal push rod piston, however, is greater than the outlet stroke, because the travel-limiting flexible element, which is generally relatively soft, must first be compressed to a certain degree before it sets the outlet valve in motion. In addition to the spring force, the frictional forces acting on the push rod piston, which is guided in a sealed manner, must also be overcome.

The arrival of the valve seat on the outlet valve sealing surface of the control valve does not immediately lead to an opening of the inlet valve as the push rod piston continues its motion, because the inlet valve, as a rule, is loaded by a biased spring having a certain closing force, and an additional force is exerted in the closing direction by the supply pressure in the chamber behind the inlet valve. To overcome these forces the travel-limiting flexible element is compressed by a certain additional amount, before the desired opening of the inlet valve is accomplished, thus introducing the associated brake pressure.

Thus, the travel-limiting flexible element must be capable of performing this entire travel stroke.

If, however, the auxiliary force fails, then the travel-limiting flexible element represents a wasted motion element, for when the auxiliary force is missing, the entire pedal travel path must be available for braking. Until now, an action to disengage the travel-limiting flexible element has required complicated measures that were susceptible to malfunctions.

OBJECT AND SUMMARY OF THE INVENTION

The brake force amplifier according to the invention has the advantage that the travel-limiting spring can be disengaged by simple means, without requiring complicated and malfunction-susceptible devices to be employed in the brake amplifier.

An additional advantage is that the disengagement device can be located at any desired point in the motor vehicle in the vicinity of the brake amplifier, depending on space conditions.

The invention will be better understood as well as further objects and advantages thereof become more apparent from the ensuing detailed description of the preferred embodiments taken in conjunction with the drawings.

DESCRIPTION OF THE PREFERRED EMBODIMENT

Figure 1:
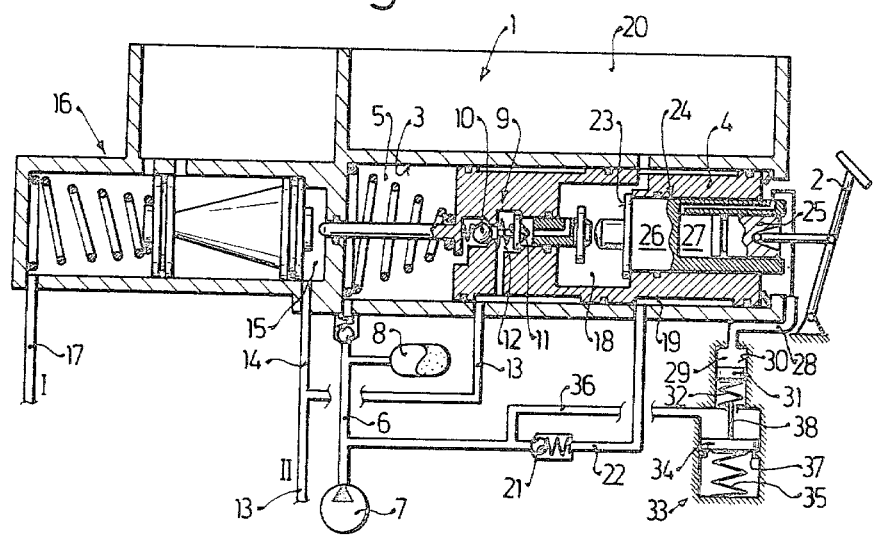
FIG. 1 shows schematically the embodiment of a brake force amplifier with one type of a travel-limiting flexible medium.

Turning now to the drawings, a double circuit brake amplifier 1 is connected between a brake pedal 2 and two brake circuits I and II. It has an augmenter cylinder 3, in which an augmenter piston 4 is arranged to reciprocate. On the side opposite the pedal 2, the augmenter piston 4 borders a pressure chamber 5, to which both a pump 7 and a reservoir 8 are connected by means of a pressure line 6.

In the center of the augmenter piston 4 there is a control valve 9, which comprises an inlet valve 10 and an outlet valve 11. The closing body of the outlet valve 11 and the spring that loads the same are arranged in a pressure exchange chamber 12, which is connected both with the rear axle brake circuit II by means of a brake line 13, and with a primary chamber 15 of an hydraulic main cylinder 16 by means of a branch line 14. The hydraulic main cylinder 16 is intended to supply a front axle brake circuit I by means of a brake line 17.

The outlet valve 11 continually communicates with a discharge chamber 18, which is arranged in the augmenter piston 4 and is connected to a refill container 20 by means of an annular recess 19 in the augmenter piston 4. An additional excess pressure line 22, provided with a pressure valve 21, communicates with pressure line 6 and leads to this annular recess 19 and hence to the refill container 20.

On the side toward the brake pedal 2 the discharge chamber 18 is bordered by the frontal surface 23 of a brake pedal push rod 24, which comprises in two parts, a push rod piston 25 activated by the pedal and a push rod cylinder 26 which supports the frontal surface 23. Between these two parts is a push rod fluid chamber 27. The fluid chamber 27 is connected by means of a line 28 to a travel-limiting spring fluid chamber 29, with said travel-limiting spring fluid chamber 29 being located in a decentralized travel-limiting cylinder 30 that is arranged outside of the amplifier. A piston 31 is arranged in the travel-limiting spring cylinder 30 and the piston 31 is subject to the effect of a spring 32. This spring 32 is the travel-limiting spring of the brake amplifier 1. In this manner the push rod fluid chamber 27, the line 28 and the travel-limiting fluid chamber 29 form a largely incompressible circuit.

A disengaging device 33 for the travel-limiting spring 32 is provided on the same axis as the travel-limiting spring cylinder 30. The disengagement device 33 has a switch piston 34, which is subject on one side to the effect of a spring 35 and on the other side is subject to reservoir pressure by means of a reservoir pressure line 36, which branches off from the excess pressure line 22 in front of the excess pressure valve 21. Subjected to this reservoir pressure, the switch piston 34 usually lies against a stop means as shown at 37. The switch piston 34 includes a piston rod 38, which extends through the travel-limiting spring 32 and engages the piston 31

METHOD OF OPERATION

When the brake pedal 2 is activated the push rod piston 25 penetrates into the cylinder 26. When this happens, fluid is squeezed out of the chamber 27 through the line 28 and into the chamber 29, and the piston compresses the travel-limiting spring 32. Depending on the counteraction of the travel-limiting spring 32, first the outlet valve 11 is closed, and then the inlet valve 10 is opened. When the control valve 9 has been set into its braking position the travel-limiting spring 32 is completely compressed. At this time brake pressure fluid is led out of the pressure chamber 5 into the brake circuit II and into the primary chamber 15, so that both brake circuits I and II receive pressure. The brake pressure being introduced can also be detected by the driver through the pressure effect in the chamber 27, so that he can apply the brakes much more accurately.

If the auxiliary force fails, the spring 35 presses the switch piston 34 upward. The free end of the piston rod 38 then passes through the travel-limiting spring 32 and strikes the piston 30. The travel-limiting spring fluid chamber is then decreased in size until the push rod chamber 27 is filled to capacity. Once that condition is attained, the push rod piston 25 and the brake pedal 2 are again returned to their original position. The control valve 9 at this time will also have run through its full activating stroke. If the brakes are then applied the travel-limiting spring 32 and the control valve 9 are disengaged and the augmenter piston 4 is displaced in the direction of braking by the pedal push rod 24. The pressure chamber 5, which is filled with fluid, is decreased in size, and the fluid travels through the brake line 13 into the brake circuit II, thereby activating the brake circuit I in the sense of braking by means of the primary chamber 15 of the main cylinder 16.

It is generally known that if the auxiliary force fails, the entire brake pedal travel path must be available for braking in order to compensate at least partially for the failure of the auxiliary force with a longer brake pedal travel path.

Figure 2:
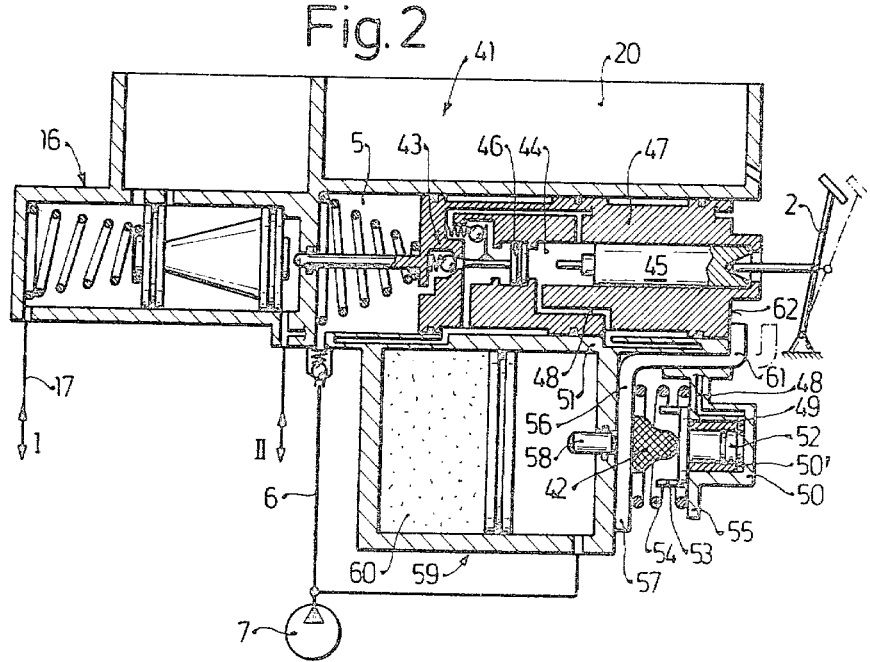
FIG. 2 also shows schematically another embodiment of a brake amplifier with a device to extend the pedal travel path.

The manner in which the device according to the present invention advantageously combines this principle, using simple means, with the described disengagement of the travel-limiting spring medium is shown in FIG. 2. In this embodiment of the invention the same reference numerals are used for elements that were described in the first embodiment of the invention shown in FIG. 1.

Here, in a double circuit brake amplifier 41, a rubber travel-limiting flexible element 42 is also arranged outside of the amplifier and away from a control valve 43. An hydraulic transfer circuit comprises a push rod fluid chamber 44, which is arranged between the frontal surface of a brake pedal operated push rod piston 45 and an activating piston 46 of the control valve 43. This chamber 44 is connected to a fluid chamber 50' by means of a channel 48, which passes through the augmenter piston 47 and also forms a part of the hydraulic circuit. This fluid chamber 50' is arranged between an inner stop element 49 of a cap 50 and a piston 52. The cap 50 is attached to the side of a housing 51 of the brake amplifier 41. The piston 52 overlaps a portion of the travel-limiting flexible element 42 with an annular flange 53.

A double right angle bracket 56 includes one leg that is supported on one edge 55 of the cap 50 by means of a strong spring 54. The travel-limiting flexible element 42 is attached to another leg 57 of the bracket 56 with the rear side thereof arranged to cooperate with a push rod 58, which is located opposite a disengagement device 59. This disengagement device is formed similarly to that in FIG. 1, except that here a gaseous medium is used as an opposing spring.

The bracket 56 includes an upstanding tongue 61 that usually lies against a radial end surface 62 on the brake pedal side of the augmenter piston 47, thereby determining the original position of the brake pedal 2 by means of the pedal push rod piston 45.

Figure 3:
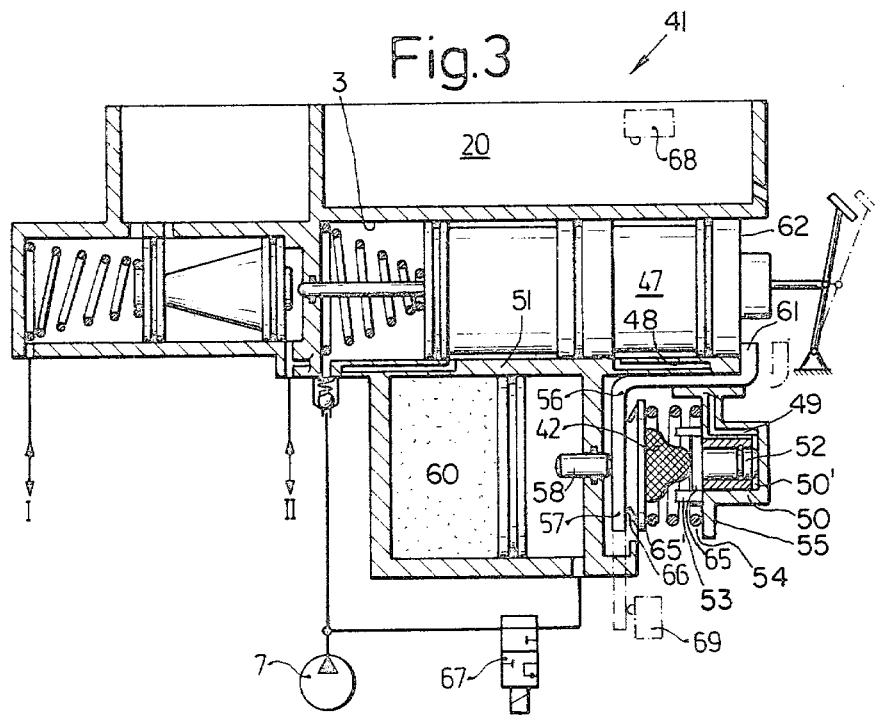
FIG. 3 shows schematically still another embodiment of the invention shown in FIG. 2.

Referring to FIG. 3, the augmenter piston 47 is shown from the outside and the details of the push rod fluid chamber 44, the push rod piston 45 and other attending features of the augmenter piston 47 internally thereof are shown in FIG. 2 of the drawings. The fluid chamber 50', the bottom 49, the cap 50, the linkage piston 52, the housing 51, the annular flange 53 are shown in FIG. 3, together with the spring 54, the edge 55, the push rod 58, the gas spring 60, the tongue 61, the end surface 62 and the disengagement device 59. The valve piston 46 and the control valve 43 are shown in FIG. 2.

Turning now to the method of operation it should be noted that during braking the rubber travel-limiting flexible element 42 is biased by means of the hydraulic circuit arrangement comprising 44, 48, 50'. Not until the travel-limiting flexible element 42 is compressed is the valve piston 46 moved and the control valve 43 switched.

If the reservoir pressure fails, the disengagement device 59 activates the push rod 58. The bracket 56 then moves to the right against the strong spring 54 until it reaches the annular flange 53. The arm 61 attains a position shown by a broken line, in which the brake pedal 2, also shown as a broken line, is urged up into the driver's compartment. This results in a larger brake pedal travel path now being available. At the same time the chamber 44 is filled by means of the hydraulic circuit 44, 48, 50' of the travel-limiting flexible element 42, so that an incompressible connection is established between the brake pedal push rod piston 45 and the valve piston 46. During braking—aside from the travel loss from switching the control valve 43—brake pressure is immediately produced in the pressure chamber 5.

In this embodiment of the invention, various elements are not moved until the auxiliary force fails. This presents no problem with regard to mechanical defects such as seizing or jamming.

This sort of disadvantage is avoided in the embodiment shown in FIG. 3 by the placement of a plate 65 and a plate tension spring 66 between the arm 57 of the bracket 56 and the rubber travel-limiting flexible element 42. The augmenter piston 47 then moves with the bracket 56 during the various engagement and disengagement pressures of the pump 7, so that during practically every brake activation a small motion of these elements takes place. Thus any seizing is safely avoided.

Because the path of the travel-limiting flexible element 42 is already partially blocked when the reservoir is nearly empty, in an improved embodiment of the amplifier 1 or 41 the transitional range in an almost empty reservoir can be improved by an adjusting member as will be understood by those skilled in this art. It is also conceivable that a multiple position valve can be used. In such case a level indicator 68 is provided in the refilling container 20 and a travel switch 69 is provided on the dependent portion of arm 57.

With this type of embodiment the travel switch 69 switches the magnetic valve 67 to allow a return flow when the level switch 68 does not respond.

Figure 4:
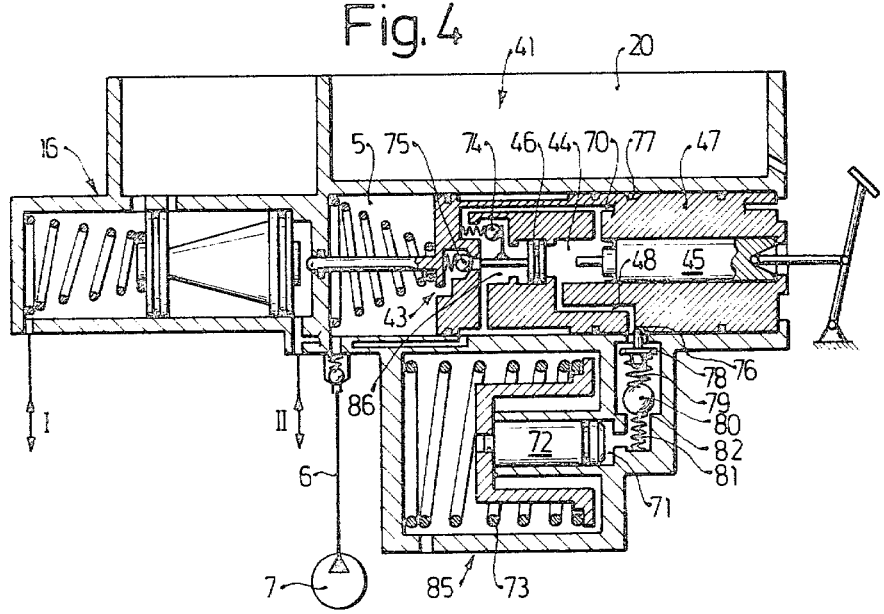
FIG. 4 shows schematically another embodiment arranged for blocking of the travel-limiting flexible medium that occurs when the auxiliary force fails.

FIG. 4 shows a further embodiment of this invention in which the construction is generally the same as in FIG. 2 and the reference numerals that appear there are used here as well. Here the augmenter piston 47 includes an annular zone having a chamfer area 76. By means of this chamfer 76 a loading spring 79 can be varyingly biased by means of a spring plate 78 that has an upstanding integral pin that is arranged to cooperate with the chamfer 76. The spring 79 acts on a closing body 80 of a valve 80/82, which closing body 80 is loaded in the opposite direction by a weak spring 81, said valve 80/82 arranged to be received on a valve seat 82 that is formed in the housing. An operating chamber 71 for a piston 72 lines behind the valve 80/82 and by means of the piston 72 a spring 73 of a travel-limiting pressure unit 85 can be loaded and relieved.

Accordingly, when the brake pedal 2 is activated the piston 45 penetrates into the chamber 44 and first closes an equalizing bore 70. Fluid is then forced out of the chamber 44 through the hydraulic circuit 48 into the operating chamber 71. The opposing action of the spring 73 through the piston 72 first closes an outlet valve 74 in the amplifier by means of the piston 46, and subsequently an inlet valve 75 in the amplifier is opened. Brake pressure fluid is then introduced from the pressure chamber 5 into a chamber 86. The thus-introduced pressure can be detected by the driver through the pedal 2 by means of the pressure action in the chamber 44. An increase in pressure in the chamber 44 by means of the brake pedal 2 causes the opening of the inlet valve 75 by means of the piston 46 and simultaneously causes a pressure increase in the chamber 71 by influencing the hydraulic circuit 48, thereby moving the piston 72 against the force of spring 73 that is mounted in chamber 85. The brake pedal travel path results from the movement of the piston 72 against the spring 73.

When the auxiliary force fails, only atmospheric pressure prevails in the chamber 5. When the brake pedal 2 is activated the pressure in the chamber 44 switches the brake valve 43 in the sense of braking in dependence on the opposing effect of the spring 73. The chamfer 76 presses the valve plate 78 outward. The spring 79 presses the closing body 80 against the weak spring 81 until it seals closed by abutting a valve seat 82, thereby interrupting the connection to the chamber 71. The travel path simulator is thereby disengaged and a rigid connection is established between the brake pedal 2, and the pistons 45 and 47. The prerequisite for a reliable disengagement is that the bias rate of the spring 79 must be much higher than that of the spring 81. The spring 79 serves to compensate for the difference between the depth of the chamber 77 and the closing stroke between the valve body 80 and the valve seat 82.

In this manner the travel-limiting assembly unit 85 can be automatically disengaged when the pressure source fails.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A brake force amplifier for the brake system of a motor vehicle including a brake amplifier activatable by a brake pedal, said brake system comprising a pressure source, a cylinder connected to said pressure source, an augmenter piston in said cylinder, a fluid chamber in said augmenter piston, a pressure chamber formed in said cylinder between said pressure source and said augmenter piston, a control valve in said augmenter disposed between said pressure chamber of said cylinder and said fluid chamber in said augmenter piston, said control valve monitors both a pressure line connection from said pressure source to said cylinder that contains said augmenter piston, and a connection from said cylinder to a discharge line; a travel-limiting spring assembly, said travel-limiting spring assembly arranged in a spaced relation relative to said brake amplifier and said control valve and connected to said fluid chamber in said augmenter, through a hydraulic circuit, said travel-limiting spring assembly including spring means, the tension of which can be transferred to the brake pedal by means of said hydraulic circuit and a travel-limiting spring fluid cylinder communicating with said hydraulic circuit, a piston in said fluid cylinder related to said spring means and assembled in said fluid cylinder between said spring means and said fluid chamber, and a disengagement device operatively positioned relative to said piston in said fluid cylinder for disengaging said piston on the side opposite from said fluid chamber.

2. A brake force amplifier as claimed in claim 1, further wherein the augmenter piston is arranged to receive a push rod piston and a push rod cylinder, said last named piston and cylinder enclosing a fluid chamber in communication with a line that terminates in a travel-limiting spring fluid chamber that contains a piston and cooperative spring means.

3. A brake amplifier as claimed in claim 2, further wherein said travel-limiting spring fluid cylinder is provided with a disengagement device which is positioned in an axially aligned secondary chamber.

4. A brake amplifier as claimed in claim 3, wherein said disengagement device is integral with another piston in said axially aligned secondary chamber.

5. A brake amplifier as claimed in claim 4, wherein said other piston is influenced by a spring means in said axially aligned secondary chamber.

6. A brake amplifier as claimed in claim 1, wherein said travel-limiting spring assembly includes an element supported on a reciprocable bracket.

7. A brake amplifier as claimed in claim 2, wherein said augmenter piston actuates a bracket element that includes sad travel-limiting spring assembly.

8. A brake amplifier as claimed in claim 1, wherein said travel-limiting spring assembly is disengageable upon failure of said pressure source.

* * * * *